United States Patent [19]
Walker

[11] Patent Number: 5,203,243
[45] Date of Patent: Apr. 20, 1993

[54] COMMUTATOR TRUING LATHE

[76] Inventor: Mike Walker, 657 E. Arrow Hwy., Ste. H, Glendora, Calif. 91740

[21] Appl. No.: 617,117

[22] Filed: Nov. 21, 1990

[51] Int. Cl.[5] .............................................. B23B 5/00
[52] U.S. Cl. .......................................... 82/115; 82/128
[58] Field of Search ............... 82/115, 116, 128, 141, 82/165, 162

[56] References Cited

U.S. PATENT DOCUMENTS

| | | | |
|---|---|---|---|
| 1,767,151 | 6/1930 | McCord | 82/128 |
| 1,823,642 | 9/1931 | Brown et al. | 82/115 |
| 1,923,416 | 8/1933 | Blomgren | 82/165 |
| 2,134,151 | 10/1938 | Schoenfeld | 82/128 |
| 2,187,874 | 1/1940 | Burrows et al. | 82/128 |
| 2,409,158 | 10/1946 | Simpson | 82/128 |
| 2,492,596 | 12/1949 | Ross | 82/128 |
| 3,083,600 | 4/1963 | Rhindress | 82/128 |
| 3,128,533 | 4/1964 | Haugland | 82/128 |
| 3,204,498 | 9/1965 | Haugland | 82/115 |
| 3,572,199 | 3/1971 | Harden | 82/128 |
| 4,327,613 | 5/1982 | Melby | 82/128 |

Primary Examiner—Daniel W. Howell
Attorney, Agent, or Firm—Jessup, Beecher & Slehofer

[57] ABSTRACT

A truing lathe has its components mounted on a base. A pair of stands for holding the workpiece are mounted on the base. The stands have a pair of notches where the workpiece rests and is rotatable therein. An electric motor with a pulley head is mounted on one of the stands and below the notches so that the motor drive shaft aligns with the axis of rotation of the workpiece. One loop of a stretchable endless belt is slipped over the midsection of the workpiece while the other loop is stretched to fit around the drive pulley. The cutting bit is mounted on separate longitudinally and transversely moveable blocks so that the bit can be adjusted radially and longitudinally relative to the axis of rotation of the workpiece to machine the workpiece. The mounting stand and the way the workpiece is rotated results in minimal precession of the workpiece on the lathe to allow for a closer and truer machining of the workpiece. The lathe is compactly built and can be powered by batteries under field conditions to repair electric motors used in radio controlled model cars. The type of electric motor used to run the lathe is the same type of electric motor used to power radio controlled model cars. The lathe also can be used in the hobbyist's shop.

6 Claims, 4 Drawing Sheets

COMMUTATOR TRUING LATHE

BACKGROUND OF THE INVENTION

1. Field of the Invention

TURNING: Portable lathe; lathe with a tool and work rest; the work rest having a center rest. TURNING: Work driver.

2. Description of the Prior Art

U.S. Pat. No. 3,128,533 issued in 1962 to E. Haugland discloses a portable motor driven device for turning down and undercutting the commutators of motors and generators having shafts of different lengths and diameters. The drive means for turning the commutator is provided by an electric motor having an attached pulley. A pair of opposed bearings and brackets hold the ends of the commutator in position. An endless belt has one end looped and connected to the pulley on the drive motor while the other looped end surrounds and frictionally engages the armature. The rotating drive motor, pulley and endless belt cause the commutator to rotate so that one can true the commutator with an adjustable tool bit.

Radio controlled model cars have become a popular hobby, just as radio controlled model airplanes have been a popular hobby for decades. Radio controlled model cars and model airplanes are similar in that each has a self-contained motor and power source, each has a wireless receiving device in the unit, and each is controlled by a wireless transmitter that is operated by the hobbyist. Both hobbies are conducted out in the field or at large vacant parking lots. Field conditions require the hobbyist to take along with him or her a tool kit and spare parts because of frequent mechanical breakdown of the car or airplane.

The typical radio controlled car has four wheels attached to a frame. The frame holds the wireless receiver, control cables, a battery pack and the electric drive motor. The two rear wheels are the drive wheels, which are mounted on the frame and are interconnected by a drive shaft. The electric motor is mounted parallel to the drive shaft so that the rotating motor shaft rotates parallel to and in unison with the drive shaft. An endless belt interconnects a pulley on the drive shaft with a pulley on the electric motor shaft to transfer the power from the motor to the drive wheels. The typical electric motor used in radio controlled model cars runs on direct current usually at 7.2 volts or 8.4 volts. The motor has a compact cylindrical housing about two inches long and one and one-half inches in diameter. A cylindrical armature around a power shaft is rotatably positioned in the housing. A commutator is also secured adjacent to the armature. The commutator is cylindrical in shape, and it has a pair of brushes touching it through which electricity flows. The rotation of the electric motor is adjustable and is controlled by a speed control device mounted in the car. The speed control device is in turn controlled by the operator of the transmitter. The speed control device can adjust the amount of current flowing to the motor from the onboard batteries. The batteries used are nickel-cadmium rechargeable batteries so that the batteries can be recharged after each use. Each battery, which is called a cell, is usually 1.25 volts and is packed 6, 7, or 8 to a power pack for interchangeable replacement on the model car. The electric motor is capable of reaching 50,000 rpms at full power. The electric motor has very close tolerances. During model car races, the electric motor is operated at full power for extensive periods of time. The electric motor requires frequent cleaning and truing of its commutator, because of pitting, arcing, and normal wear and tear, to keep the motor operating at its full capability. Conditions encountered out in the field occasionally require the electric motor be removed from the car, disassembled, the commutator turned, and the motor reinstalled in the car.

SUMMARY AND OPERATION OF THE INVENTION

As explained in the background of the invention, the model car hobbyist, when at a meet, occasionally needs to remove the electric motor to clean and true the commutator to return the motor to its full operating potential. Field conditions preclude the ready availability of household current, a work bench, and the right tools. The present invention was invented to solve this problem. The invention is very compact, and can be powered from a radio controlled car battery pack. The typical radio controlled model car hobbyist carries along to a race or meet at least one extra fully charged battery pack. One of the power packs can be hooked up to the drive motor on the present invention to power it. The drive motor used on the present invention is the same type of electric motor used in a radio controlled model car. The present invention is designed to turn the armature and commutator while a cutting bit is aligned adjacent the commutator and moved along the commutator to true the commutator. The invention is a lathe mounted on top of a small square base. There are a pair of rectangular shaped spaced apart mounts for holding a workpiece armature. The mounts are spaced apart about two inches so that the armature can fit between them. The tops of both mounts have two aligned V-shaped cuts to cradle the ends of the shaft passing through the armature. The V-shaped cuts form the bearing surfaces where the rotating shaft of the armature rests on the lathe. The electric motor is mounted on one of the mounts so that its power shaft is parallel to the axis of rotation line between the V-shaped bearings. The shaft of the electric motor has a pulley mounted to it.

The essence of the present invention lies in the way the workpiece is held and rotated by the lathe to minimize or prevent the workpiece, such as an armature, from wobbling or precessing about its axis of rotation. A typical prior art lathe secures one end of the workpiece in a chuck, and then rotates the chuck and work piece as a unit. Even a slight misalignment of the work piece in the chuck causes the work piece to rotate unevenly. To minimize the precession effect of a defective chuck or misalignment of the work piece, other prior art lathes secure both ends of a work piece to opposite chuck-like holders mounted on bearings to brackets and then one or both of the chucks is rotated to turn rotate the workpiece. Even this configuration results in precession of the workpiece, because the workpiece is never precisely aligned with the axis of rotation of the lathe. In the present invention, power from the rotating drive motor is transferred to the workpiece by one looped end of an elastic endless belt placed around the midsection of the armature. The other looped end of the belt is stretched to fit into the groove of the pulley on the electric motor drive shaft. The V-shaped cuts allow the ends of the workpiece to rest freely therein, and the belt tensioned around the workpiece holds the workpiece securely in the cuts while at the same time rotating the workpiece. The mounts with the V-shaped cuts and the space between the mounts are called the cradle area. The endless belt is a stretchable O-ring.

The other components on the lathe are three stacked interconnecting blocks that have the cutting head secured to one of them. The three stacked blocks are interconnected with dove tail joints and are slideable relative to each other. Two of the blocks are moveable by hand cranks to adjust or move the cutting bit towards or away from the workpiece, while another hand crank moves the cutting bit parallel to the axis of rotation of the workpiece.

DETAILED DESCRIPTION OF THE INVENTION

Figure 9:
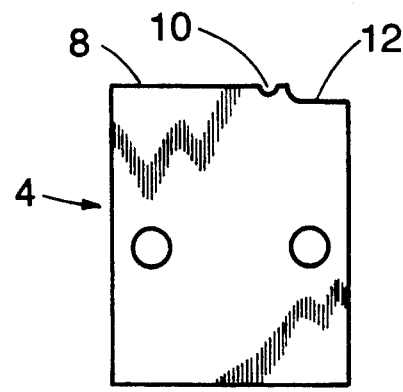
FIG. 9 illustrates an elevational view of the other workpiece support stand.
Figure 11:
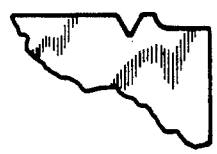
FIG. 11 illustrates a different version of the notch on the other workpiece support stand for supporting the workpiece.

The present invention, which is called a commutator truing lathe, is fabricated from a rectangular-shaped base 2 having 4" by 4" side edges and made out of aluminum or any other easily machineable alloy. A pair of spaced apart upright rectangular-shaped support stands 4 (FIG. 9) and 6 (FIG. 6) are secured to the top of and placed adjacent to one edge of the base with vertically oriented screws (not shown) extending up from the underside of the base, through the base, and screwed into the bottom portions of both stands 4 and 6. Both stands are about 2" high, 1½ inches wide, and ¼ inch thick. Both stands 4 and 6 are mounted so that both faces are mutually parallel to each other and to the same edge of the base. Both stands 4 and 6 are spaced about two inches apart. The first stand 4 closest to the edge of the base is labeled as the workpiece support stand. It has a top flat horizontal edge 8 with a V-shaped indentation or notch 10 and a slight horizontal cutaway 12 near the V-shaped notch 10 and extending to one of its vertical edges. The other facing rectangle upright stand 6 is referred to as the drive motor mount and workpiece stand 6. It also has a top flat horizontal top edge 12 with a V-shaped indentation or notch 14. Both V-shaped notches 10 and 14 are located the same distance from the corner edges of their top edges 8 and 16. Both notches are used for supporting and aligning a workpiece such as an armature 10.

Figure 1:
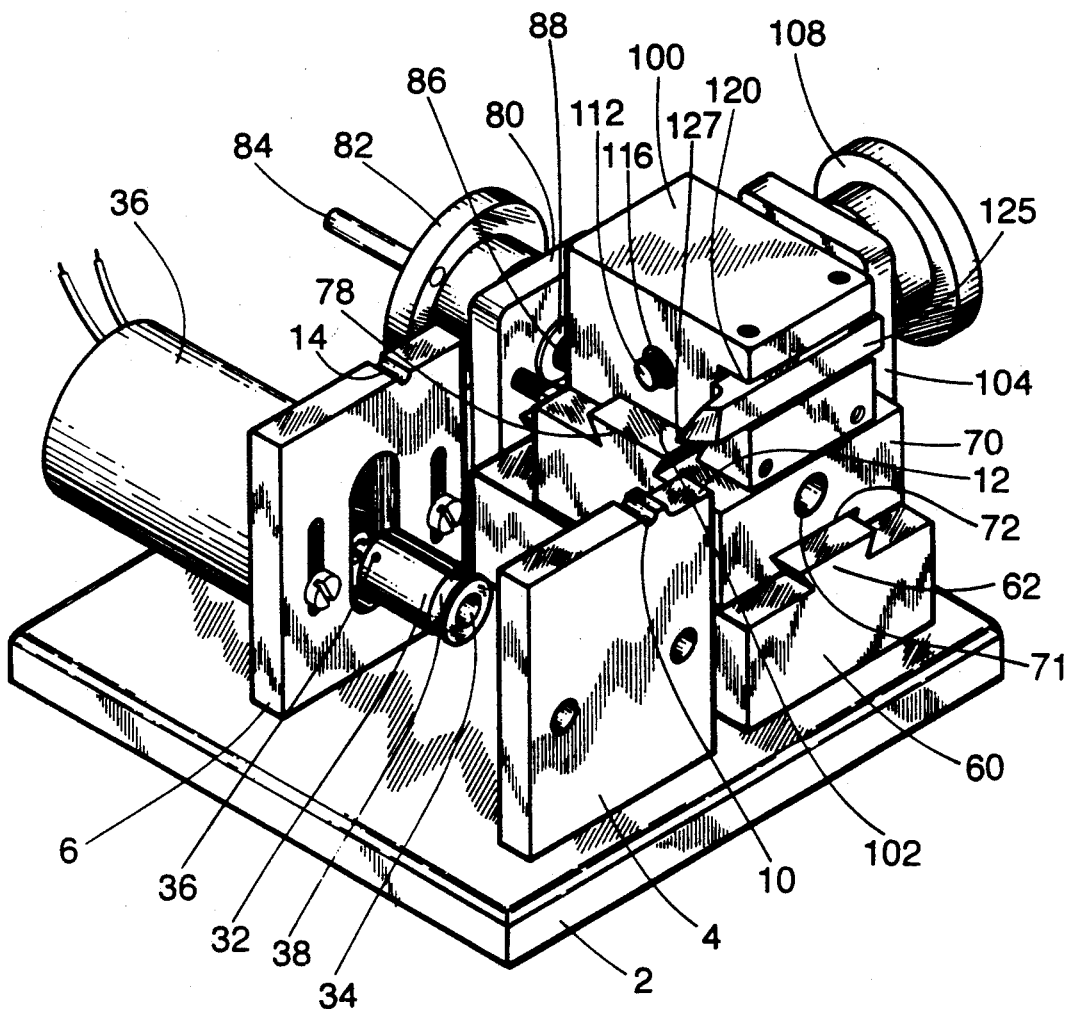
FIG. 1 illustrates a front orthogonal view of the invention clearly illustrating the cradle area.
Figure 2:
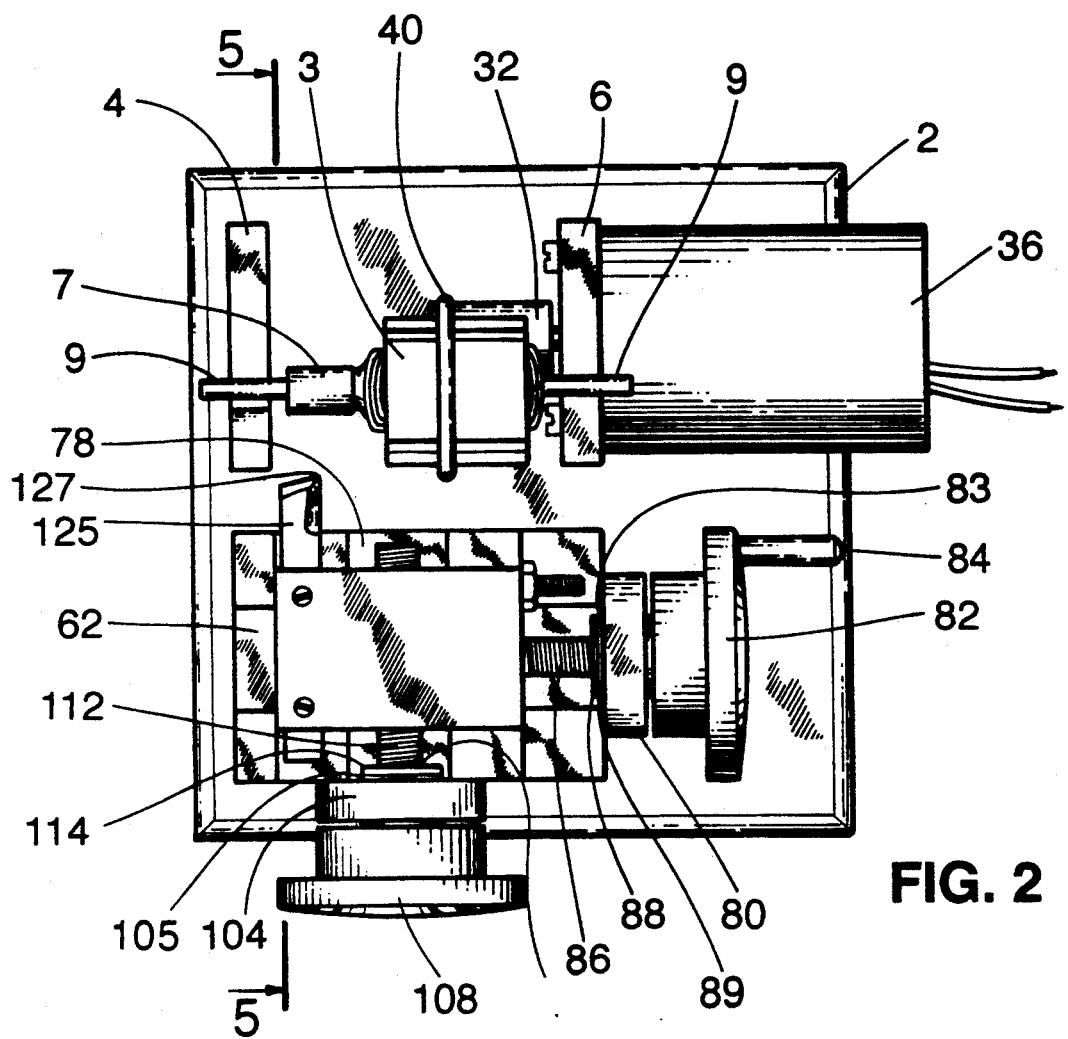
FIG. 2 illustrates a top plan view of the invention with the workpiece in position and the rubber pulley surrounding the workpiece.
Figure 3:
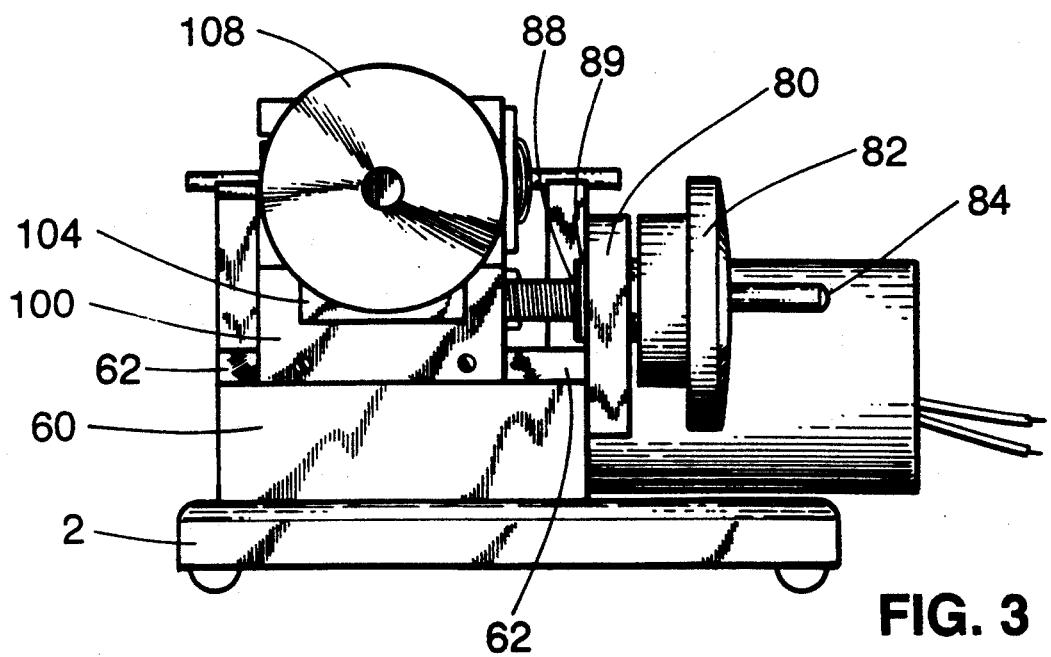
FIG. 3 illustrates an elevational left side view of the invention.
Figure 4:
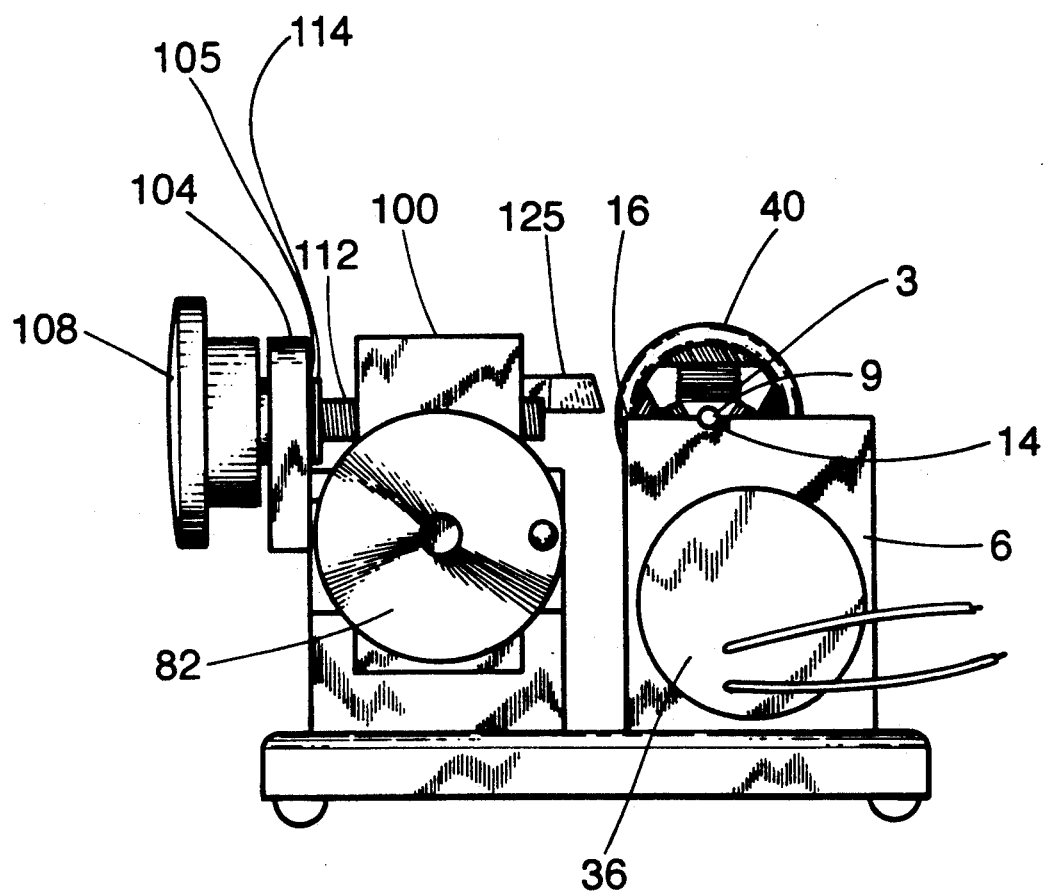
FIG. 4 illustrates a back elevational view of the invention.
Figure 5:
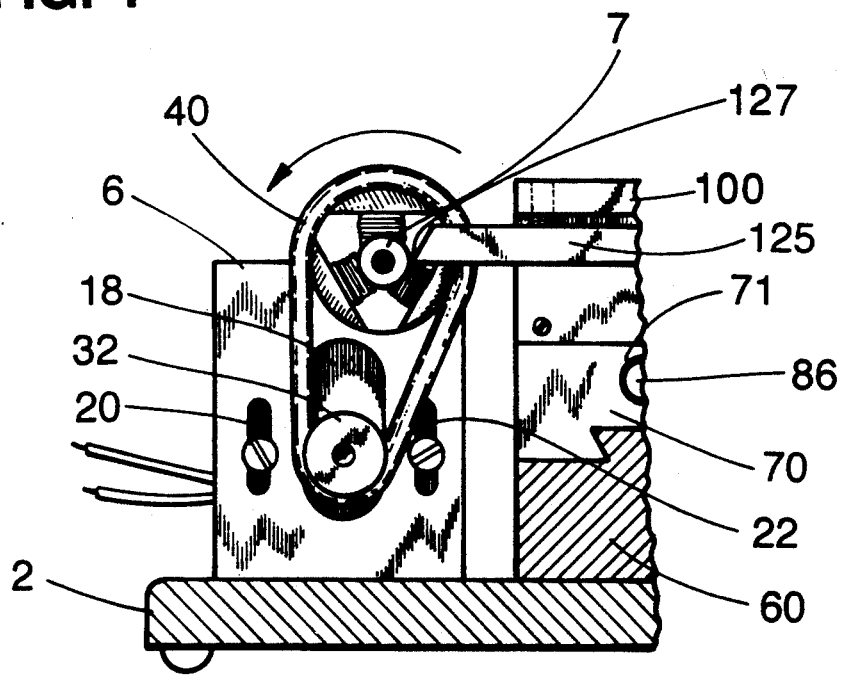
FIG. 5 illustrates a vertical sectional view of the invention taken along the line 5—5 of FIG. 2.
Figure 6:
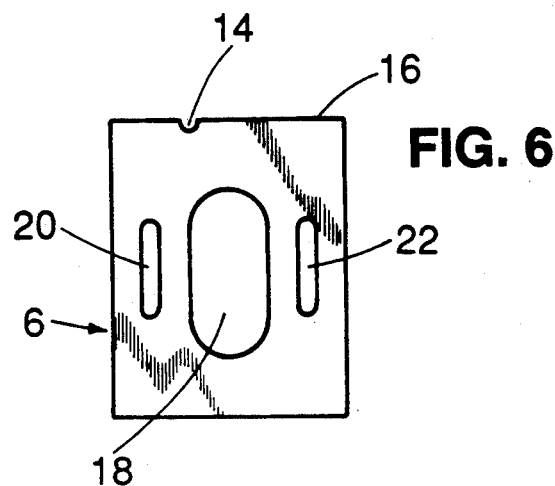
FIG. 6 illustrates an elevational view of the drive motor mount and workpiece support stand.
Figure 7:
FIG. 7 illustrates a different version of the notch on the support stand for supporting the workpiece.
Figure 8:
FIG. 8 illustrates a top plan view of the stand in FIG. 6
Figure 10:
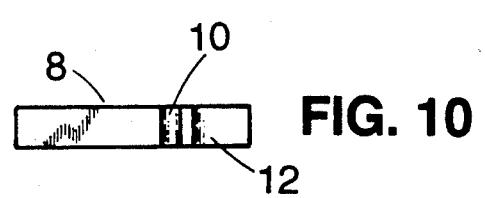
FIG. 10 illustrates a top plan view of the stand in FIG. 9.
Figure 12:
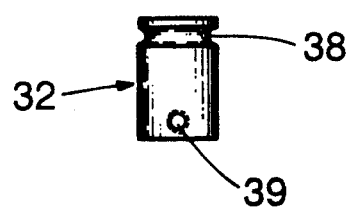
FIG. 12 is a plan view of the pulley attached to the drive shaft of the motor to turn the workpiece.
Figure 13:
FIG. 13 illustrates an end view of the pulley in FIG. 12.

The motor mounting stand 6 is illustrated in FIG. 6. It has a central vertically-oriented oval slot 18 and a pair of vertical side oval slots 20 and 22. The three slots are used to mount the face of the electric motor 36 to the stand. The large slot 18 allows the drive end with the pulley 32 to pass into and be positioned in the cradle space formed by the two stands 4 and 6. The pulley is illustrated in FIG. 12 and FIG. 13. The other two side slots 20 and 22 allow screws to pass through the mount and to threadably engage threaded holes in the face of the electric motor to mount the motor to the stand. The slots allow for vertical adjustment of the motor 30 on the stand 4.

The pulley 32 has a concentric bore 34 so that the pulley can be slipped onto the end of the drive shaft on the motor. It is secured to the shaft with a set screw 36. This allows for adjustment of the pulley axially in the cradle area. The pulley also has an annular groove 38 for holding the O-ring 40.

To use the lathe, the armature to be trued has the O-ring slipped over it and positioned about the armature's midsection. The O-ring is about 1 and one-half inches in diameter. It can be larger or smaller depending on the size of the lathe and the workpiece. The shaft of the armature is then placed in both V-shaped notches 10 and 14. The other looped end of the O-ring is then slipped onto the pulley and fitted in the groove 38. The O-ring is stretchable and has to be stretched to fit onto the pulley. The stretched out O-ring holds the armature workpiece in the cradle formed by the stands 4 and 6 and the notches 10 and 14. When the electric motor is energized, the rotating pulley in turn rotates the armature workpiece, because the stretched O-ring 40 functions like an endless friction belt on the midsection of the armature workpiece. Since the diameter of the pulley 32 is much less than the diameter of the armature, the rotation speed of the armature is much less than the rotation of the pulley. This reduction results in increasing the torque applied by the O-ring 40 to the armature 3.

The armature workpiece is cradled in the stands 4 and 6 by having its shaft 9 placed in the notches 10 and 14. The cutaway 12 adjacent the notch 10 on the top edge 8 of the workpiece support stand stand 4 provides clearance for the cutting bit 125 to move back and forth while it is cutting and truing the commutator 7 on the armature 3 placed in the lathe. The cutting bit 125 is removable and is held in place on the top radial alignment block, which will now be discussed in detail.

The base 2 has an elongate rectangular-shaped solid aluminum block secured to it with allen head screws extending from the bottom of the base, through the base, and into the body of the block. The block is 2¼" long by 1⅜" wide. It is referred to as the immoveable cutting bit support block 60. The top surface of the block 60 has a V-shaped track 62 positioned longitudinally and medially on the surface. This V-shaped track runs parallel with the imaginary line drawn between the notches 10 and 14.

A rectangular solid block 70 smaller than the block 60 is mounted on the surface of the stationary block 60. The bottom of the block 70 has a complementary V-shaped channel 72 running medially and lengthwise which mates with and is slideable along the V-shaped track 62 of the stationary block 60. The track 62 and the channel 72 form a dovetail joint in cross section.

The stationary block 60 has an upright brace 80 secured at the inside end. The brace supports a disc-shaped hand wheel 82 and crank 84, with a threaded rod 86 extending axially from the center of the disc. The shank of the rod near the disc is not threaded, and there is a retaining groove (not shown) cut in the smooth portion of the shank. The brace 80 has a centrally placed horizontal hole to allow the threaded portion of the rod 86 to pass through. There is a bushing 89 holding the smooth shank portion of the rod in the hole, and there is a retaining clip 88 clipped into the retaining groove to position the rod 86 and crank wheel 82 in the brace, and yet to allow the rod and hand wheel to be turned clockwise or counterclockwise with the user's fingers. The solid block 70 has a horizontal threaded bore 71 therethrough for mating with the threaded rod 86. The block 70 is slipped onto the block 60 by matching the dovetail joints 62 and 72 while the hand wheel 82 is turned to screw the rod 86 into the bore 71. The rotation of the hand wheel 82 causes the block 70 to slide back and forth longitudinally with respect the armature workpiece placed on the stands. The top surface of the block 70 also has a V-shaped track 78 running transversely and perpendicular to the V-shaped channel 72 cut into its bottom.

There is a third solid rectangular block 100. It is mounted on top of the block 70 and is smaller than the block 70. The bottom of the block 100 has a medially aligned V-shaped channel 102 running transversely between the longer edges of the block. The channel 102 mates with and is slideably engageable with the track 78 on the top surface of the block 70. The track 78 and channel 102 also form a dovetail joint in cross section.

The block 70 has a hand wheel and support brace mounted to it similar to the hand wheel 82 and brace 80 mounted on block 60. There is a second brace 104 mounted on the inside face of the block 70. The brace 104 has a centrally positioned hole 106 for allowing the threaded rod 112 portion of a second hand wheel 108 to be passed through. The second hand wheel has a disc 108 and an axially aligned threaded rod 112 extending from the center of the disc 108. The shank of the threaded rod adjacent the disc is smooth and unthreaded. There is a retaining groove cut in the smooth shank. There is a bushing 105 positioned in the central hole for holding the unthreaded shank portion so that the second hand wheel can be freely rotated clockwise or counterclockwise. The second retaining clip 114 and bushing 105 hold the second hand wheel in position on the second brace 114. There is a threaded bore 116 extending through the block 100. The bore 116 is superposed with the V-shaped channel 102 in the bottom of the block 100. The threaded rod 112 on the second hand wheel mates with the threaded bore 116 on the block 100 so that turning the second hand wheel will cause the block to reciprocate on its dove tail joint. The block 100 reciprocates along a path perpendicular to the axis of rotation of the workpiece.

The block 100 has a horizontal U-shaped channel 120 cut in the side of the outside of the block, and parallel with the bore 116 in the block 100. The U-shaped channel 120 is used to position the cutting bit 125. The bit has an elongate solid rectangular shape and has an integral cutting tip 127 at one end. The cutting bit is held in place with set screws. The bit and tip combination is replaceable.

Before the operator positions the armature on the lathe, the cutting bit is moved out of the way by turning both hand wheels counterclockwise to dock the bit at its at rest position. The armature is then mounted on the stand as previously discussed. To shave off and true the surface of the commutator already positioned on the mounting stands 4 and 6, the operator connects the cord from the electric motor 36 to a power source such as a battery pack. This starts the armature rotating on the stand. The operator of the lathe then turns the second hand wheel 108 clockwise to move the block 100 with the bit 125 radially towards the commutator. This adjustment is perpendicular to the axis of rotation of the armature workpiece. The bit is positioned adjacent to the commutator and then the first hand wheel 82 is turned to sweep the bit 125 in a direction parallel to the axis of rotation of the workpiece. The bit 125 shaves off and trues the surface of the commutator 7. The bit can be adjusted and passed along the commutator until the commutator truing process is finished.

What is claimed is:

1. A commutator truing lathe comprising:
    a base;
    cradle means mounted on said base for mounting a workpiece to be trued or machined;
    said cradle means comprises:
        a pair of spaced apart upright mounts mounted parallel with each other on said base;
        each said mount having a V-shaped depression and aligned with each other for holding a variety of sizes of workpieces while they are being rotated and machined;
    motor drive means having a pulley at its power send for providing means for rotating the workpiece about a longitudinal spinning axis on said cradle means;
    mounting means for mounting said motor means on said cradle means; cutting bit means for truing and machining the workpiece;
    means for moving said cutting bit parallel to said longitudinal spinning axis of the workpiece;
    means for moving said cutting bit radially relative to said spinning axis of the workpiece; and
    elastic belt means interconnecting said pulley on said motor drive means with said body of the workpiece for rotating the workpiece when said drive means is energized.

2. A commutator truing lathe comprising:
    a base;
    cradle means mounted on said base for mounting a workpiece to be trued or machined;
    said cradle means comprises:
        a pair of spaced apart upright mounts mounted parallel with each other on said base;
        each said mount having a hemicircular-shaped depression and aligned with each other for holding a variety of sizes of workpieces while they are being rotated and machined;
    motor drive means having a pulley at its power end for providing means for rotating the workpiece about a longitudinal spinning axis on said cradle means;
    mounting means for mounting said motor means on said cradle means;
    cutting bit means for truing and machining the workpiece;

means for moving said cutting bit parallel to said longitudinal spinning axis of the workpiece;

means for moving said cutting bit radially relative to said spinning axis of the workpiece; and elastic belt means interconnecting said pulley on said motor drive means with said body of the workpiece for rotating the workpiece when said drive means is energized.

3. A commutator truing lathe comprising:

a base;

cradle means mounted on said base for mounting a workpiece to be trued or machined;

said cradle means comprises:

a pair of spaced apart upright mounts mounted parallel with each other on said base;

each said mount having a U-shaped depression and aligned with each other for holding a variety of sizes of workpieces while they are being rotated and machined;

motor drive means having a pulley at its power end for providing means for rotating the workpiece about a longitudinal spinning axis on said cradle means;

mounting means for mounting said motor means on said cradle means;

cutting bit means for truing and machining the workpiece;

means for moving said cutting bit parallel to said longitudinal spinning axis of the workpiece;

means for moving said cutting bit radially relative to said spinning axis of the workpiece; and elastic belt means interconnecting said pulley on said motor drive means with said body of the workpiece for rotating the workpiece when said drive means is energized.

4. A commutator truing lathe comprising:

a base;

cradle means mounted on said base for mounting a workpiece to be trued or machined;

said cradle means comprises:

a pair of spaced apart upright mounts mounted on said base;

each said mount having a V-shaped depression in line with each other for holding a variety of sizes of workpieces while they are being rotated and machined;

motor drive means having a pulley at its power end for providing means for rotating the workpiece about a longitudinal spinning axis on said cradle means;

mounting means for mounting said motor means on said cradle means;

cutting bit means for truing and machining the workpiece;

means for moving said cutting bit parallel to said longitudinal spinning axis of the workpiece;

means for moving said cutting bit radially relative to said spinning axis of the workpiece; and elastic belt means interconnecting said pulley on said motor drive means with said body of the workpiece for rotating the workpiece when said drive means is energized.

5. A commutator truing lathe comprising:

a base;

cradle means mounted on said base for mounting a workpiece to be trued or machined;

said cradle means comprises:

a pair of spaced apart upright mounts mounted on said base;

each said mount having a hemicircular-shaped depression in line with each other for holding a variety of sizes of workpieces while they are being rotated and machined;

motor drive means having a pulley at its power end for providing means for rotating the workpiece about a longitudinal spinning axis on said cradle means;

mounting means for mounting said motor means on said cradle means;

cutting bit means for turing and machining the workpiece;

means for moving said cutting bit parallel to said longitudinal spinning axis of the workpiece;

means for moving said cutting bit radially relative to said spinning axis of the workpiece; and elastic belt means interconnecting said pulley on said motor drive means with said body of the workpiece for rotating the workpiece when said drive means is energized.

6. A commutator truing lathe comprising:

a base;

cradle means mounted on said base for mounting a workpiece to be trued or machined;

said cradle means comprises:

a pair of spaced apart upright mounts mounted on said base;

each said mount having a U-shaped depression in line with each other for holding a variety of sizes of workpieces while they are being rotated and machined;

motor drive means having a pulley at its power end for providing means for rotating the workpiece about a longitudinal spinning axis on said cradle means;

mounting means for mounting said motor means on said cradle means;

cutting bit means for truing and machining the workpiece;

means for moving said cutting bit parallel to said longitudinal spinning axis of the workpiece;

means for moving said cutting bit radially relative to said spinning axis of the workpiece; and elastic belt means interconnecting said pulley on said motor drive means with said body of the workpiece for rotating the workpiece when said drive means is energized.

* * * * *